United States Patent
Dronadula et al.

(10) Patent No.: US 10,694,341 B2
(45) Date of Patent: *Jun. 23, 2020

(54) EXTENSION OF WI-FI SERVICES MULTICAST TO A SUBNET ACROSS A WI-FL NETWORK USING SOFTWARE-DEFINED NETWORK (SDN) TO CENTRALLY CONTROL DATA PLANE BEHAVIOR

(71) Applicant: Fortinet, Inc., Sunnyvale, CA (US)

(72) Inventors: Lakshmi Narayana Dronadula, Bangalore (IN); Ajay Malik, Sunnyvale, CA (US); Avinash Bhagtani, Pleasanton, CA (US); Saurabh Kumar Agarwal, Bengaluru (IN); Nuwas Ponnambathayil, Bengaluru (IN)

(73) Assignee: Fortinet, Inc., Sunnyvale, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/698,643

(22) Filed: Sep. 8, 2017

(65) Prior Publication Data
US 2018/0070216 A1    Mar. 8, 2018

Related U.S. Application Data

(63) Continuation of application No. 14/813,060, filed on Jul. 29, 2015, now Pat. No. 9,794,757.

(51) Int. Cl.
*H04W 4/06* (2009.01)
*H04L 12/24* (2006.01)
(Continued)

(52) U.S. Cl.
CPC ........... *H04W 4/06* (2013.01); *H04L 41/0803* (2013.01); *H04L 43/028* (2013.01); *H04L 12/189* (2013.01); *H04W 84/12* (2013.01)

(58) Field of Classification Search
None
See application file for complete search history.

(56) References Cited

U.S. PATENT DOCUMENTS 9,038,151 B1   5/2015   Chua
9,350,678 B2   5/2016   Mann
(Continued)

*Primary Examiner* — Bunjob Jaroenchonwanit
(74) *Attorney, Agent, or Firm* — Law Office of Dorian Cartwright; Dorian Cartwright

(57) ABSTRACT

Wi-Fi services multicast to a subnet in a software-defined network (SDN) are extended. An SDN controller centrally monitors a data plane of a Wi-Fi network. Advertisements for services within a first subnet by an advertising station are forwarded to the SDN controller. Parameters of the service of the advertising station are extracted for storage by performing deep packet inspection on the one or more packets. Queries for services within a second subnet by a querying station are also forwarded to the SDN controller. Parameters of the service of the querying station are extracted for storage by performing deep packet inspection on the one or more packets. The query for service to the advertisement matches responsive to the advertisement parameters compared to the query parameters. Responsive to matching, a set of connection parameters necessary for the querying station at the second subnet to connect to the advertising station at the first subnet is sent.

9 Claims, 7 Drawing Sheets

(51) Int. Cl.
*H04L 12/26* (2006.01)
*H04W 84/12* (2009.01)
*H04L 12/18* (2006.01)

(56) References Cited

U.S. PATENT DOCUMENTS

| | | |
|---|---|---|
| 9,432,257 B2 | 8/2016 | Li |
| 9,590,898 B2 | 3/2017 | Gunasekaran |
| 9,705,694 B2 * | 7/2017 | Dronadula .......... H04L 12/1886 |
| 9,794,757 B2 * | 10/2017 | Dronadula .............. H04W 4/06 |
| 2006/0248208 A1 | 11/2006 | Mann |
| 2013/0163475 A1 | 6/2013 | Beliveau |

* cited by examiner

EXTENSION OF WI-FI SERVICES MULTICAST TO A SUBNET ACROSS A WI-FL NETWORK USING SOFTWARE-DEFINED NETWORK (SDN) TO CENTRALLY CONTROL DATA PLANE BEHAVIOR

CROSS-REFERENCE TO RELATED APPLICATIONS

This application claims priority as a continuation of U.S. patent application Ser. No. 14/813,060, filed Jul. 29, 2017, the contents of which hereby incorporated by reference in its entirety.

FIELD OF THE INVENTION

The invention relates generally to computer networking, and more specifically, to extending Wi-Fi services multicast to a subnet in a software-defined network (SDN).

BACKGROUND

Wi-Fi networks are widely-available and used more often with the growth of mobile devices. These networks operate under standards such as IEEE 802.11 (promulgated by the Institute of Electrical and Electronics Engineers), and others (e.g., Hot Spot 2.0). The increasing availability of Wi-Fi coverage and number of devices available over networks has grown along with consumer expectations that devices are available over networks.

In more detail, computer or hardware services are locally available with zero configuration (zeroconf) to any local devices over a subnet using services such as Bonjour is a service provided by Apple Inc. of Cupertino, Calif. For example, a Bonjour-enabled printer or Apple television advertises a presence with packets that are wirelessly multicast. A Bonjour-enabled smart telephone using the Apple IoS or other operating system periodically queries for available devices. If allowed, the smart phone automatically handshakes with the service or device for allowing use from the smart phone.

Problematically, Bonjour services are limited to a particular subnet because multicast Domain Name System (mDNS) service records is restricted to multicasting in a local subnet. Many enterprise networks are comprises of several subnets and virtual local access networks (VLANs).

What is needed is a robust technique to extend Wi-Fi services multicast to a subnet across a network using SDN. Additionally, multicast flooding should be prevented.

SUMMARY

These shortcomings are addressed by the present disclosure of methods, computer program products, and systems for extending Wi-Fi services multicast to a subnet across a Wi-Fi network using software-defined network (SDN) controller to centrally coordinate data plane behavior.

In one embodiment, an SDN controller centrally monitors network traffic on a data plane (layer 2) from each of the plurality of network components distributed around the wireless communication network for a plurality of subnets. Advertisements for service from a querying station in a first subnet are forwarded from one of the network components. The advertisement can be multicast to the subnet and the forward can be unicast to the SDN controller. Parameters of the service of the advertising station are extracted for storage by performing deep packet inspection on the one or more packets.

In another embodiment, queries for service from a querying station in a second subnet are forwarded from one of the network components. The query multicast to the subnet and the forward being unicast to the SDN controller. Parameters of the service of the querying station are extracted for storage by performing deep packet inspection on the one or more packets. The query for service to the advertisement matches responsive to the advertisement parameters compared to the query parameters. Responsive to matching, a set of connection parameters necessary for the querying station at the second subnet to connect to the advertising station at the first subnet is sent.

Advantageously, local services are available across a network. Furthermore, multicast flooding is precluded.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for extending Wi-Fi services multicast to a subnet across a Wi-Fi network using software-defined network (SDN) controller to centrally coordinate data plane behavior. One of ordinary skill in the art will recognize that many other scenarios are possible, as discussed in more detail below.

Systems to Extend Services Multicast to a Subnet Across a Wi-Fi Network Using SDN (FIGS. 1-5)

Figure 1:
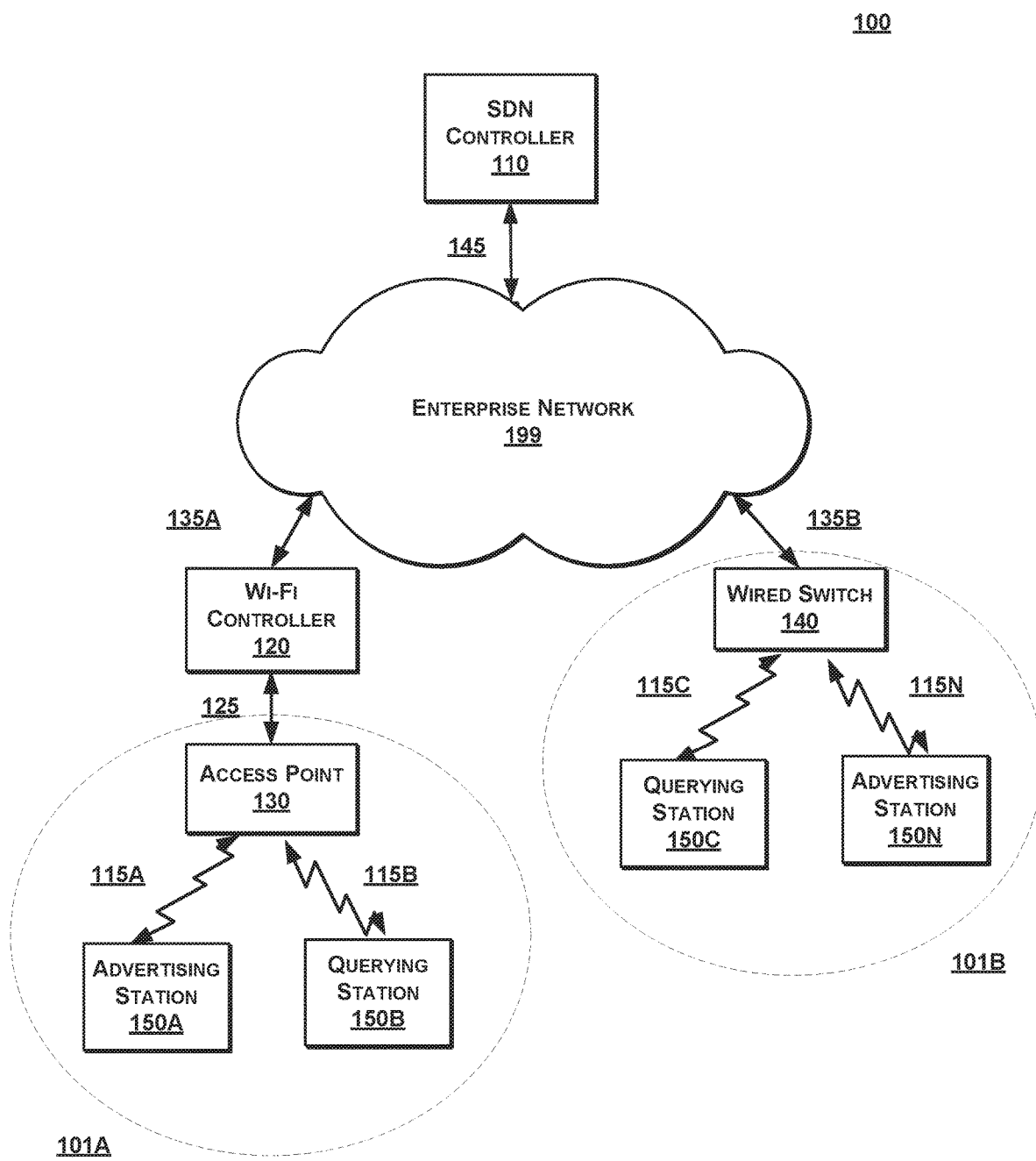
FIG. 1 is a high-level block diagram illustrating a system to extend Wi-Fi services multicast to a subnet across a Wi-Fi network using SDN, according to one embodiment.
Figure 2:
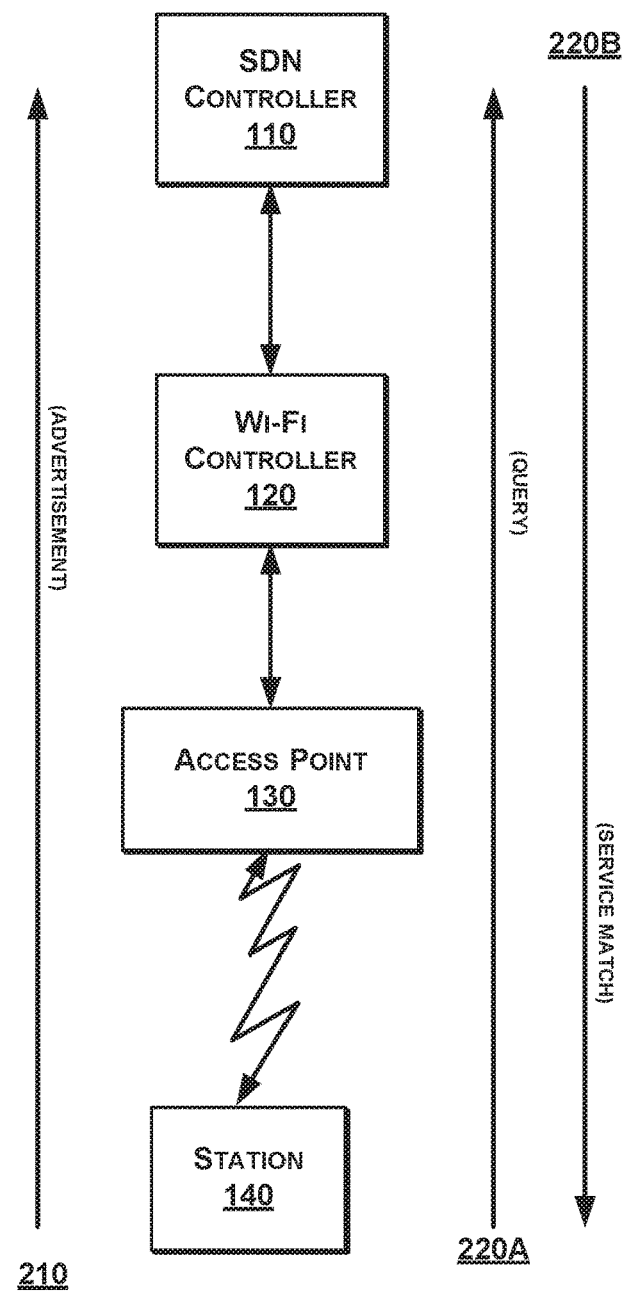
FIG. 2 is block diagrams illustrating data paths along a network hierarchy for extending subnet services, according to some embodiments.

FIG. 1 is a high-level block diagram illustrating a system 100 to extend Wi-Fi services multicast to a subnet across a Wi-Fi network using SDN, according to one embodiment. The system 100 comprises an SDN controller 110, a Wi-Fi controller 120, an access point 130 (one or more), wired switch 150, and stations 150A-N. The components can be coupled to a network 199, such as the Internet, a local network or a cellular network, through any suitable wired (e.g., Ethernet) or wireless (e.g., Wi-Fi or 4G) medium, or combination. At a high-level, the SDN controller 110 tracks service advertisements forwarded from local subnets, as well as queries for service forwarded from local subnets, and manages connections between service advertisements and queries across the different local subnets. As referred to herein, Wi-Fi services include application programs, databases, hardware access, network services, or any functionality provided by one computer to another through a network connection, for example, using Bonjour. Many other embodiments are possible.

Embodiments of the system 100 can be implemented in conjunction with a network security system, for example, the FortiGate Network Security platform by Fortinet of Sunnyvale, Calif. For example, advertisements tracked by the SDN controller 110 can pass through the network security system and be examined for viruses or intrusions.

In a preferred embodiment, the stations 150A-N are coupled to the access point 130 and the wired switch 140 through wireless communication channels 115A-N. The access point 130 can be coupled to the SDN via communication channel 125 to the Wi-Fi controllers 120 which connects to the enterprise network 199 via communication channel 135. The SDN controller 110 also connects to the enterprise network 199 using communication channel 145. The enterprise network 199 can represent a business enterprise, a hospital or system of hospital, school, building, or the like. Other embodiments of communication channels are possible, including a cloud-based controller, and hybrid networks. Additional network components can also be part of the system 100, such as firewalls, virus scanners, routers, switches, application servers, databases, and the like.

The SDN controller 110 tracks service connection requests for services over multiple subnets, in one embodiment. A first subnet 101A includes the stations 150A,B and the access point 130, and a second subnet 101B includes the stations. In some cases, the Wi-Fi controller 120 can also be included in the subnet 101A, as well as stations from other access points or switches. In other cases, stations serviced by a common access point are members of different subnets. When an advertising station 150A multicasts advertisements for services being offered in subnet 101A, the advertisements are forwarded by the access point 130 to the SDN controller 110 responsive to Open Flow rules describing how to handle either the particular service, source address, or destination address, as shown in data path 210 of FIG. 2. After initial advertisements are forwarded, some embodiments drop later continued advertising packets without forwarding. The SDN controller 110 analyzes the packets to determine parameters about the service being offered and stores the information (e.g., from SRV (service) records, PTR (pointer) records and/or TXT (text) records). Similarly, advertisements are forwarded by the wired switch 140 from subnet 101B when received from the advertising station 150N. In some embodiments, the SDN controller 110 or other downstream components send an ACK (acknowledgment) packet or other packets requesting additional information about the services being offered. In other embodiment, one or more subnet extension policies set which subnets can advertise or query for services to different subnets. Open Flow rules can be sent to network components to implement subnet extension policies.

The SDN controller 110 also matches queries for services over multiple subnets with available services, in another embodiment. Like the advertisements, when querying station 150B multicast queries for services being offered in subnet 101A, the queries are forwarded by the access point 130 to the SDN controller 110 responsive to Open Flow rules, as shown in data path 220A of FIG. 2. The SDN controller 110 compares queries to stored services gathered from various subnets, and sends a service match, as shown in data path 220B of FIG. 2. In one embodiment, the SRV, PTR and/or TXT records pulled from advertisements are searched with respect to requests to identify potential service matches. In some embodiments, queries are dropped when a matching service is not available, and in other embodiments, a message is returned. In still other embodiments, subsequent queries can be dropped downstream, for example, at the access point 130 or the Wi-Fi controller 120.

More generally, the SDN controller 110 centralizes data plane decision-making for the access point 130, the Wi-Fi controller 120 and/or the wired switch 140. To do so, components are configured to concede layer 2 routing decisions to the SDN controller 110 by forwarding packets to the SDN controller 110 for routing instructions. The SDN controller 110 can use input gathered across the network to make layer 2 routing decisions for the packets which are communicated back to the components. In one embodiment, routing decisions are made as a reaction to new or unknown flows. In another embodiment, access points are pre-configured by the SDN controller with rules for automatically implementing SDN controller 110 decisions on matching packets in the future. In still another embodiment, the rules or policies are distributed to the other network devices along a routing path for multi-hop data plane control.

Figure 9:
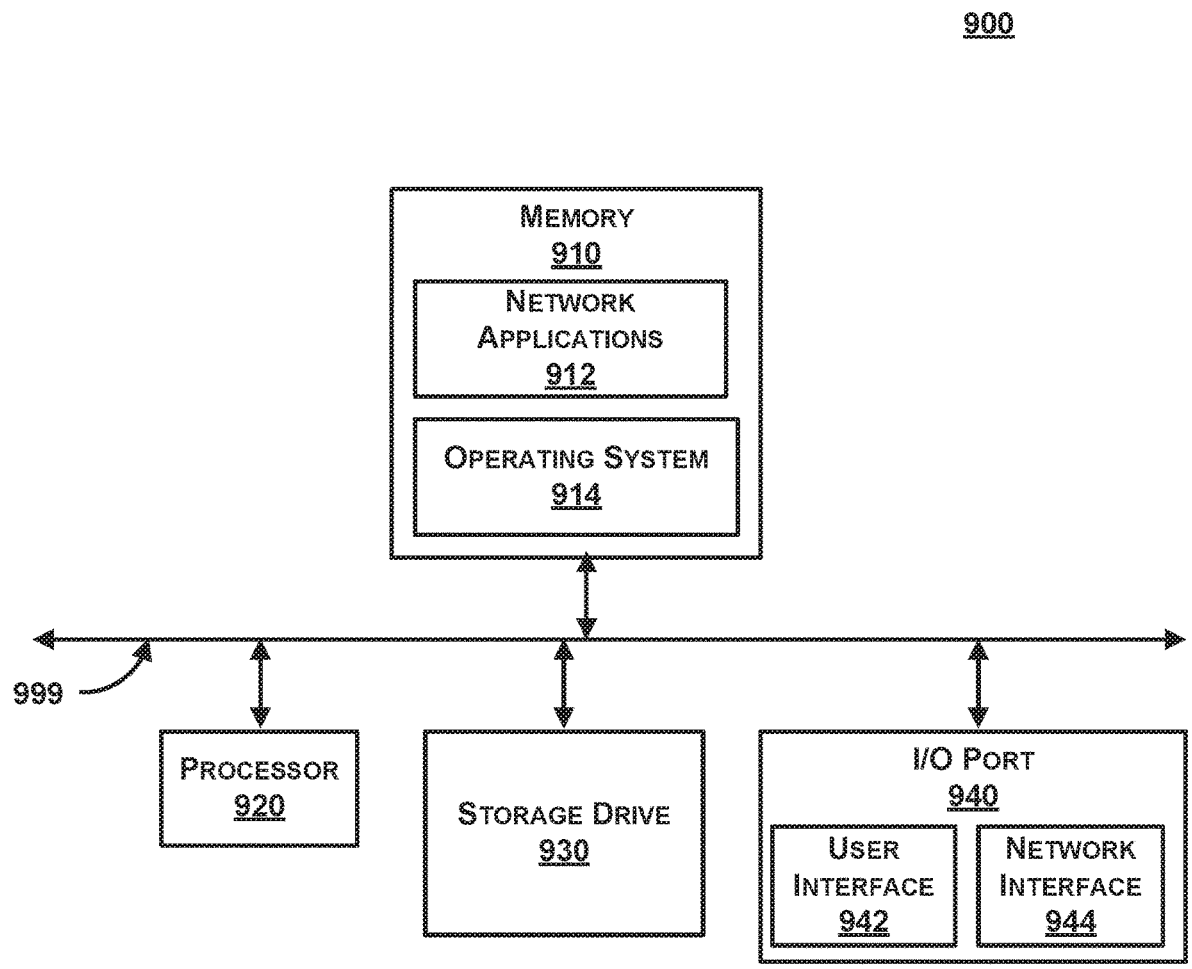
FIG. 9 is a block diagram illustrating an exemplary computing device, according to one embodiment.

The SDN controller 110 can be, for example, a personal computer, a laptop computer, a server, a cloud-based device, a virtual device, or the like implemented in any of the computing devices discussed herein (e.g., see FIG. 9). Additional embodiments of the SDN controller 110 are discussed with respect to FIG. 3.

The Wi-Fi controller 120 tunnels packets to the SDN controller 110, on behalf of the access points 130A-N, such as when the Wi-Fi controller 120 manages a group of the access points 130A-N, in some embodiments. In other embodiments, the tunnel bypasses the Wi-Fi controller 120 (see FIG. 2A versus FIG. 2B). In some cases, the Wi-Fi controller 120 received Open Flow rules for implementation. Other functionalities of the Wi-Fi controller 120 include communication with each of the access point 130A-N to manage wireless connections to the stations 140A-N using IEEE protocols. In some embodiments, BSSIDs (Basic Service Set Identifiers) are managed from the Wi-Fi controller 120 to implement functionality such as seamless mobility for transparent handoffs of stations between access points all having a common BSSID. In other functionality such as virtual port, the Wi-Fi controller 130 coordinates a uniquely-assigned BSSID for each station in order to provide individualized management of stations connected at any access point.

Further, although the Wi-Fi controller 120 has some network-wide visibility, it is limited to Wi-Fi-relevant information for load balancing, managing a number of station connections across a group of access points, tracking BSSIDs, and the like. The Wi-Fi controller 120 has limited control over a wired portion of networks, unlike the SDN controller 110. While the higher-layer decisions on the access point 130 can have some indirect impact on data plane decision making, the SDN controller 110 makes direct data plane decisions. The SDN controller 110 policies, as implemented, can override, co-exist, or compete with policies of the Wi-Fi controller 120 and the access point 130.

The Wi-Fi controller 120 can be implemented in any of the computing devices discussed herein (e.g., see FIG. 9). For example, the Wi-Fi controller 120 can be an MC1500 or MC6000 device by Meru Networks of Sunnyvale, Calif. In one embodiment, the SDN controller 110 and the Wi-Fi controller 120 are integrated into a single physical device. In another embodiment, information concerning network management is passed between the SDN controller 110 and the Wi-Fi controller 120. More embodiments of the Wi-Fi controller 120 are discussed with respect to FIG. 4.

The access points 130A-N tunnel packets of a flow to the SDN controller 110 in a if there are no local rules instructing on how to handle the packets. The default mode allows the SDN controller 110 the advantage of making layer 2 routing decision, as described herein. In some cases, an Open Flow rule is received by a particular access point indicating that future packets from the same flow should be handled by a bridge mode, using Open Flow rules. As a result, that access point sends the packet directly to the destination address. A new flow or session between the same stations could be handled by the same Open Flow rules, or initially tunneled to the SDN controller 110 for handling.

To provide network service to the stations 150A,B, in one embodiment, the access point 130 complies with IEEE 802.11 protocols (promulgated by the Institute of Electrical and Electronics Engineers) to provide Wi-Fi service to the stations 140A-N over wireless communication channels 140A-N. Under IEEE 802.11, a beacon with one or more BSSIDs is periodically sent to advertise a presence for new connections and maintain current connections. Then the access point 130 listen for packets addressed to associated BSSIDs and ignore packets addressed to unassociated BSSIDs. Furthermore, the access point 130 forward packets addressed to MAC (Media Access Control) addresses of associated stations.

The access point 130 includes one or more individual access points implemented in any of the computing devices discussed herein (e.g., see FIG. 9). For example, the access point 130 can be an AP 110 or AP 433 (modified as discussed herein) by Meru Networks of Sunnyvale, Calif. A network administrator can strategically place the access point 130 for optimal coverage area over a locale. The access point 130 can, in turn, be connected to a wired hub, switch or router connected to the enterprise network 199 (or an external network). In embodiment, the access point 130 functionality is incorporated into a switch or router. The wired switch 140 can also be SDN-enabled.

The stations 150A-N can be, for example, a personal computer, a laptop computer, a tablet computer, a smart phone, a mobile computing device, a server, a cloud-based device, a virtual device, an Internet appliance, or any of the computing devices described herein (see e.g., FIG. 9). No special client is needed for this particular technique, although other aspects of the network may require downloads to the stations 150A-N. The stations 150A-N access to, for example, a LAN or external networks using a RF (radio frequency) antenna and network software complying with IEEE 802.11.

Figure 3:
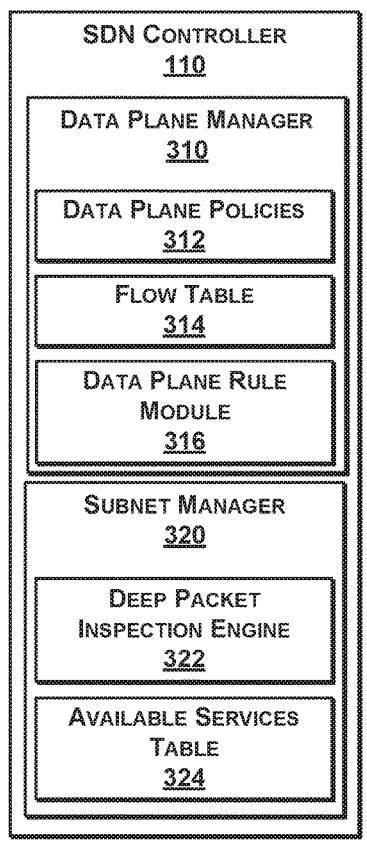
FIGS. 3-5 is a more detailed block diagram illustrating an SDN (Self-Defined Networking) controller, a Wi-Fi controller, and an access point of the system of FIG. 1, respectively, according to some embodiments.

FIG. 3 is a more detailed block diagram illustrating the SDN controller 110 of the system 100, according to one embodiment. The SDN controller 110 comprises a data plane manager 310 and a subnet manager 320. The components can be implemented in hardware, software, or a combination of both.

The data plane manager 310 centrally manages layer 2 routing decisions. The data plane manager 310 further comprises data plane policies 312 representing a database, table, or other description of policies stored locally, remotely, or distributed. As referred to herein, data plane policies are layer 2 routing decisions that are implemented outside of intelligent Wi-Fi flow policies. For example, a policy can The SDN controller can use input gathered across the network to make layer 2 routing decisions for the packets which are communicated back to the forwarding one of the access points 130A-N. In one embodiment, routing decisions are made as a reaction to new or unknown flows. In another embodiment, access points are pre-configured by the SDN controller with rules for automatically implementing SDN controller 110 decisions on matching packets in the future. In still another embodiment, the rules or policies are distributed to the other network devices along a routing path for multi-hop data plane control. In one embodiment, one or more subnet extension policies describe which subnets are extendable for advertisements and queries, along with other aspects of the extension.

A flow table 314 of the data plane manager 310 maintains a list of current and past flows affected by various policies. In some embodiments, the flow table is exported to other components along with Open Flow rules. Generally, a flow as referred to herein comprises a series of packets between a common source address and destination address. Each flow can have individual sessions representing a file transfer, login through log off, opening through closing an application, and the like.

The data plane rule module 316 of the data plane manager 310 generates rules (e.g., OpenFlow rules, XML rules, source code, or proprietary commands) in real-time and in response to access point monitoring and/or deep packet inspection. The rules can set up a bridge, tear down a bridge, or implement other actions or settings. Additional modules can be added for other types of analysis and action. Some embodiments preconfigure network components with Open Flow rules to treat advertisements and queries. For example, Bonjour packets can be profiled and layer 2 identification rules sent to the access point 130 or the wired switch 140. When identified, corresponding advertisement or query packets can be forwarded, encapsulated with additional local information, dropped, adjusted in priority, and the like.

The subnet manager 320 further comprises a deep packet inspection engine 322 and an available services table 324. The deep packet inspection engine 322 can sniff forwarded advertisement packets to determine characteristics of a service being advertised. More specifically, multicast DNS (mDNS) records including SRV (service record), PTR (pointer) and TXT (text) records can be extracted from the packets. The SRV records map a name of a service instance to information needed by a client to actually use the service. The PTR records enable service discovery by mapping a type of service to a list of names of specific instances of that type of service. The TXT records have the same name as the corresponding SVR record, and can contain a small amount of additional information about the service instance. Further, a specific service can be detected from patterns related to data field formatting, signatures, metadata, or an explicit identification. One or more packets can be unwrapped as if being received at a destination in order to expose files or commands of higher layers. The extracted information can be stored locally in the available services table 324, or stored remotely in other embodiments.

Additionally, the deep packet inspection engine 322 can sniff forwarded query packets to determine characteristics of a service being requested. In one implementation, the service is explicitly listed and matched to the available services table 324. In another implementation, the service is implicitly inferred by circumstances of packet data and also other factors known by the system 100, such as device type and connection history. The subnet manager 320 also connects advertising stations 150A,N to querying stations 150B,C by communicating as an intermediary between devices. For example, the service match message from the SDN controller 110 to the one of the querying stations includes an address of service and other data needed to complete the connection as if the response was directly from an advertising station. In some embodiments, the subnet manager 320 passively redirects actual packets between connecting devices in order to facilitate service connections.

Figure 4:
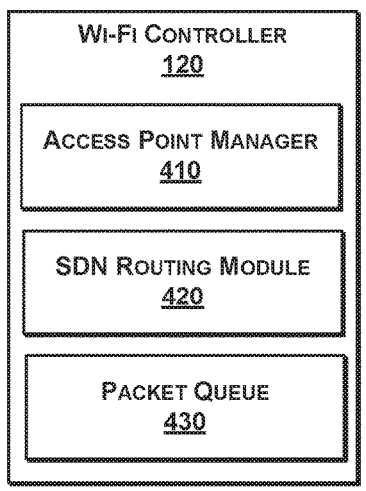

FIG. 4 is a more detailed block diagram illustrating a representative Wi-Fi controller 120 that comprises an access point manager 410, an SDN routing module 420 and a packet queue 430. The components can be implemented in hardware, software, or a combination of both. The access point manager 410 communicates with a group of access points for Wi-Fi functionality such as assigning BSSIDs and transferring stations between access points. Then SDN routing module 420 implements Open Flow compatibility through an interface with the SDN controller 110. In some embodiments, the SDN routing module 420 drops advertisements or queries rather than forwarding, depending on a specific configuration. Finally, a packet queue 430 stores packets that are being processed or are awaiting further instructions. In one embodiment, the Wi-Fi controller 120 tunnels a copy of a packet stored in the packet queue 440, but receives instructions on how to handle with just a reference to the stored packet for disposition.

Figure 5:
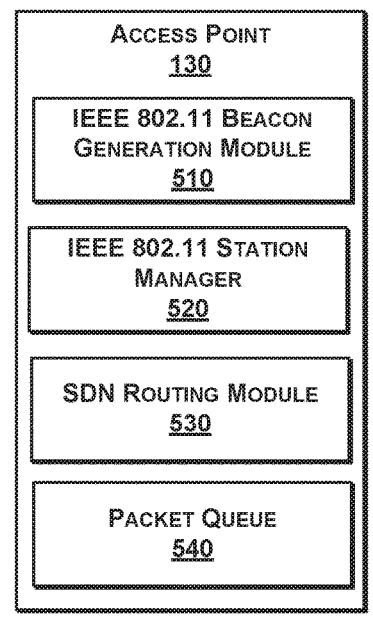

FIG. 5 is a more detailed block diagram illustrating a representative access point 130 of the system 100, according to one embodiment. The access point 130 comprises an IEEE 802.11 beacon generation module 510, an IEEE 802.11 station manager 520, an SDN routing module 530, and a packet queue 540. The components can be implemented in hardware, software, or a combination of both.

The IEEE 802.11 beacon generation module 510 generates beacons with embedded BSSIDs and parameters, according to IEEE 802.11 protocols. The IEEE 802.11 station manager 520 stores globally and/or locally-influenced parameter values, policy-based parameter values, manually configured parameter values, or the like. Wi-Fi status data related to a number of connected stations, usage data, and the like can be collected from the IEEE 802.11 beacon generation module 510 and the IEEE 802.11 station manager 320 for the SDN controller 110.

The SDN routing module 530 forwards packets and statuses to the SDN controller 110. The first few packets from new flows can be sent to the SDN controller 110 for analysis. Alternatively, there may already be rules present that direct handling of the new flows. Example statuses can be a download rate for a specific flow, queue capacity, routing statistics, and more. Periodic updates are made on a regular basis or responsive to change. Additionally, the SDN routing module 530 implements rules in OpenFlow or other formats. The packet queue 540 stores packets for flows until forwarded to an appropriate station.

Figure 6:
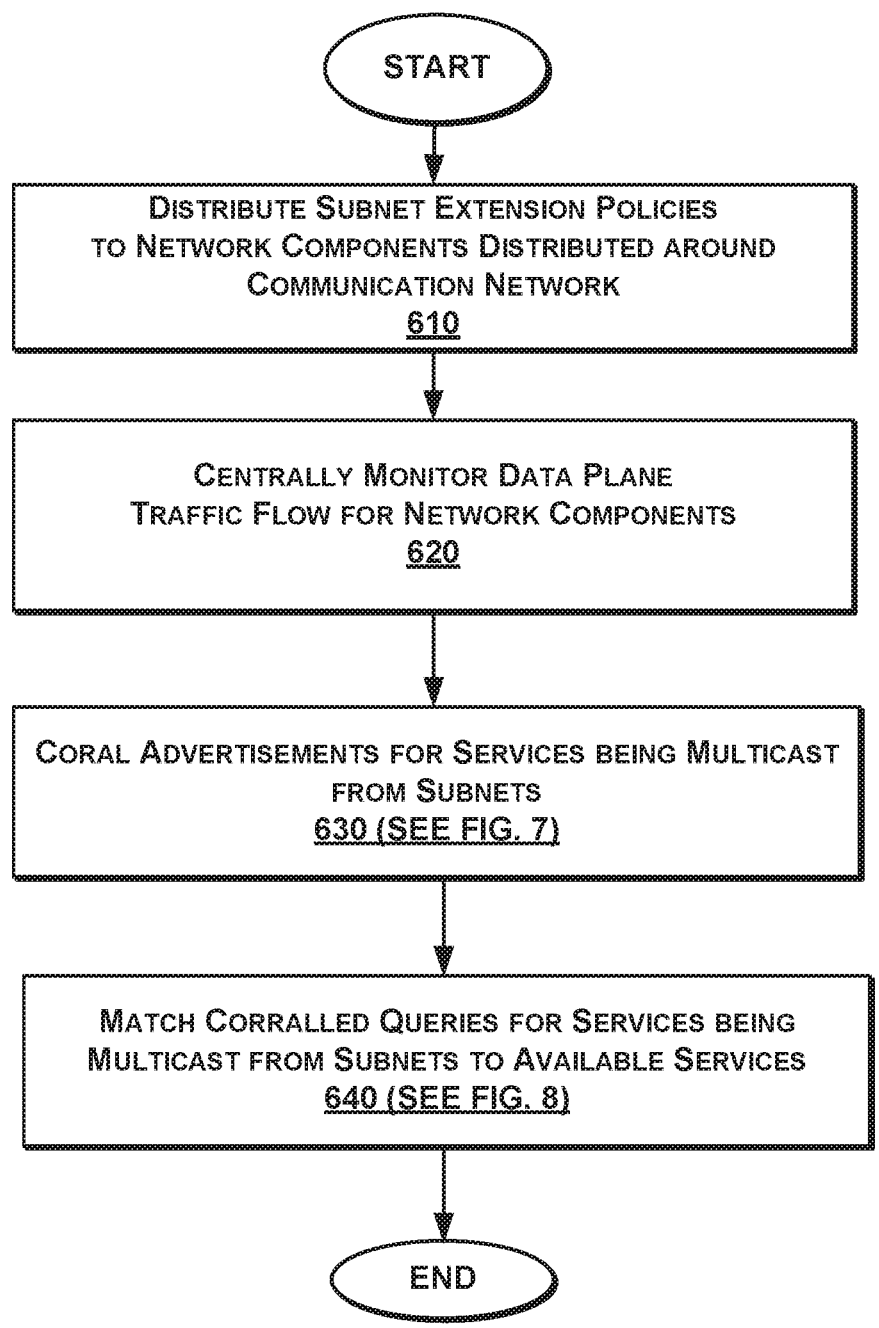
FIG. 6 is a high-level flow diagram illustrating a method for extend Wi-Fi services multicast to a subnet across a Wi-Fi network using SDN, according to one embodiment.
Figure 7:
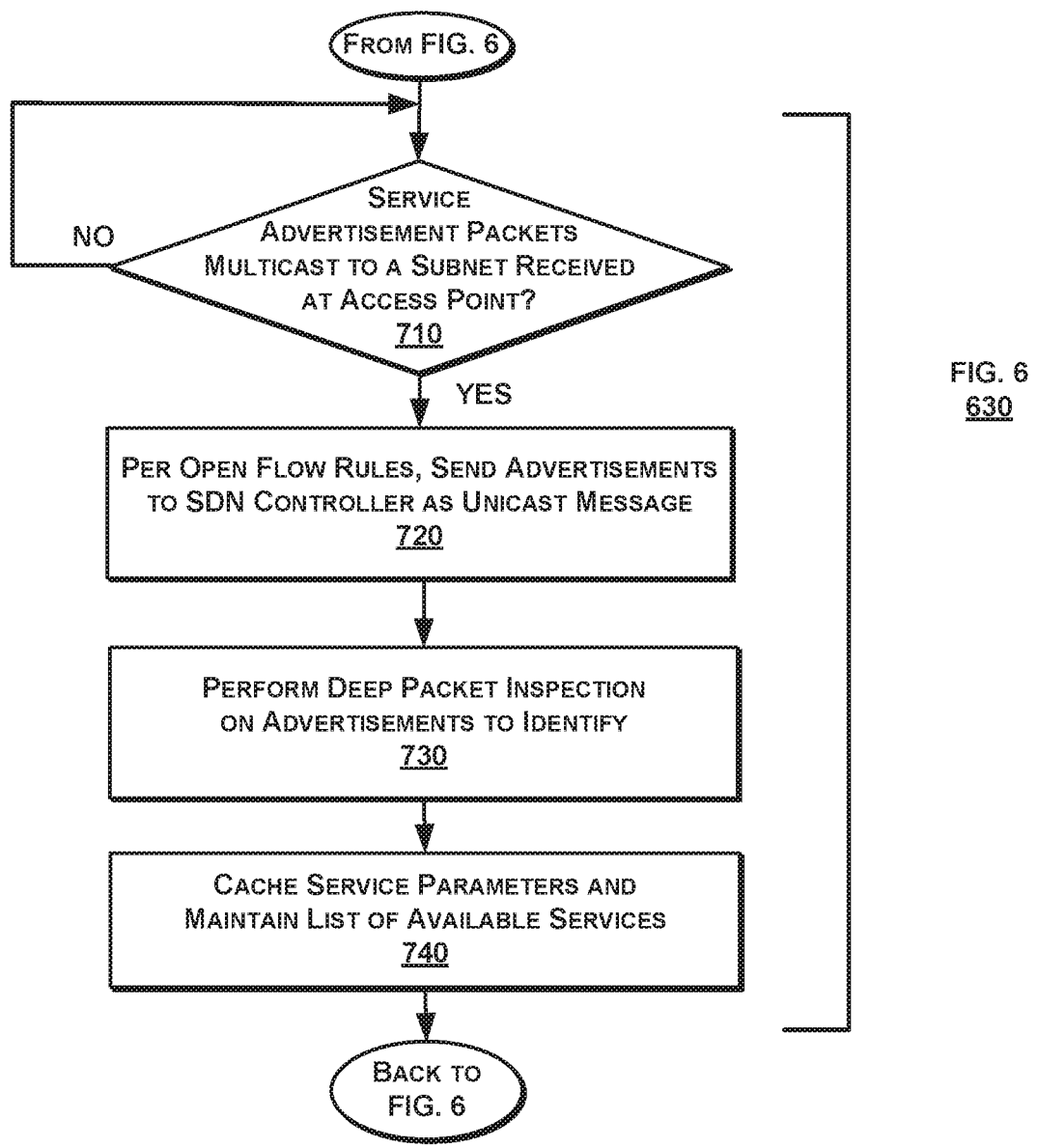
FIG. 7 is a more detailed flow diagram illustrating a step of corralling advertisements for services being multicast for the method of FIG. 6, according to one embodiment.
Figure 8:
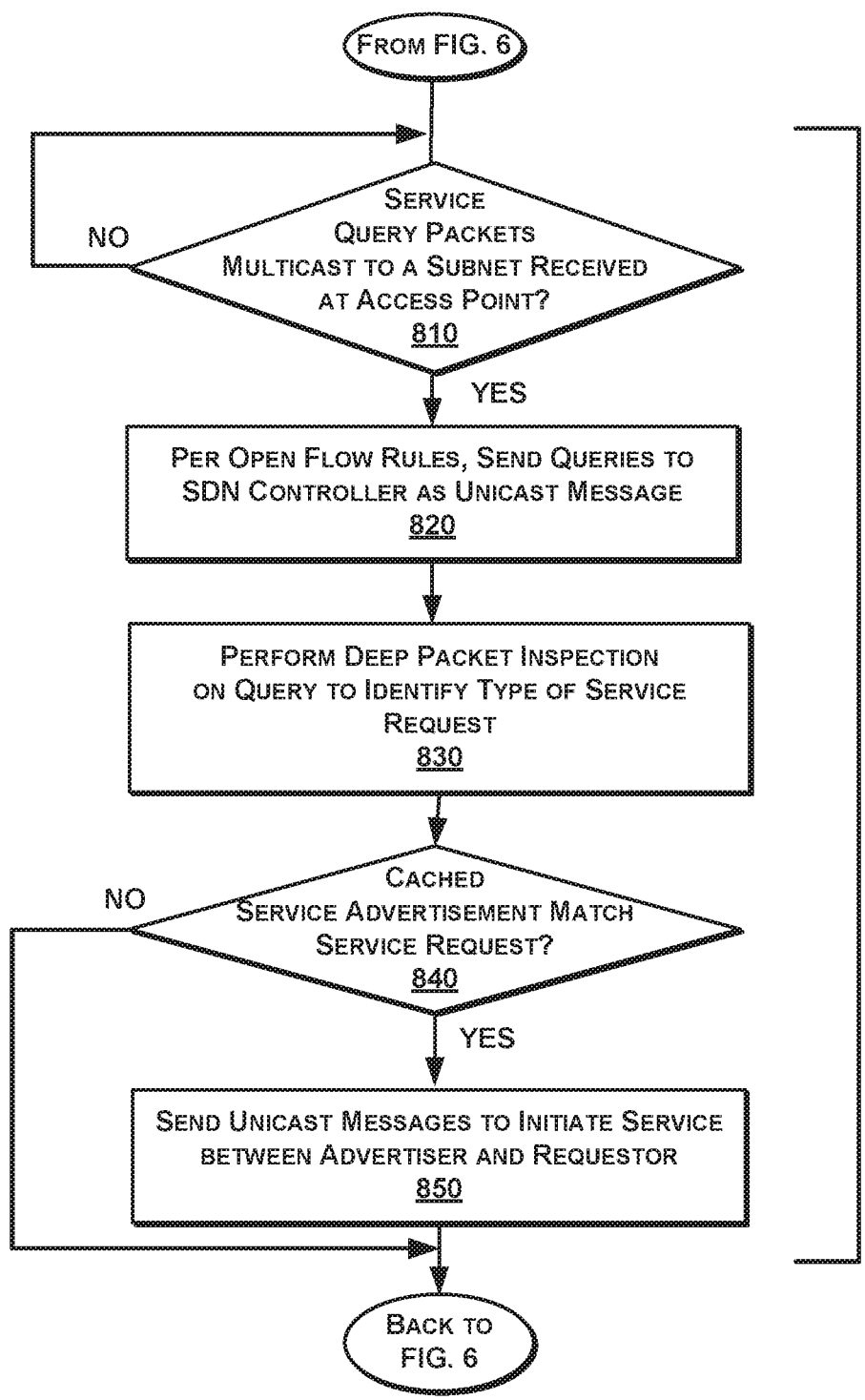
FIG. 8 is a more detailed flow diagram illustrating a step of corralling queries for services being multicast for the method of FIG. 6, according to one embodiment.

Methods for Extending Services Multicast to a Subnet Across a Wi-Fi Network Using SDN (FIG. 6-8)

FIG. 6 is a high-level flow diagram illustrating a method 600 for extend Wi-Fi services multicast to a subnet across a Wi-Fi network using SDN, according to one embodiment. One of ordinary skill in the art will recognize that the method 600 is non-limiting as other embodiments can have more or less steps and can be performed in a different order.

Subnet extension policies concerning a network are distributed to network components (step 610). Based on the policies, network components can be preconfigured with Open Flow to recognize and handle advertisements and queries. Traffic flow of the data plane is centrally monitored at the network components (step 620). Advertisements for services being multicast from subnet are corralled (step 630), as detailed below in association with FIG. 7. To do so, multicast advertisements are converted to unicast messages forwarded to an SDN controller. Suppression of additional packets prevents multicast flooding of a network. Corralled queries for services being multicast from subnets are matched to available services (step 640), as described more fully below with respect to FIG. 8. Queries can be corralled and forwarded in a similar manner to advertisements.

FIG. 7 is a more detailed flow diagram illustrating the step 630 of corralling advertisements for services being multicast for the method of FIG. 6, according to one embodiment.

When service advertisement packets being multicast to an access point are detected (step 710), the advertisements are forwarded to an SDN controller as a unicast message (step 720). Deep packet inspection is performed on advertisements at an SDN controller to identify services being advertised (step 730). A list of available services is cached and maintained (step 740).

FIG. 8 is a more detailed flow diagram illustrating the step 640 of corralling queries for services being multicast for the method of FIG. 6, according to one embodiment.

When service query packets being multicast to an access point are detected (step 810), the advertisements are forwarded to an SDN controller as a unicast message (step 820). Deep packet inspection is performed on queries at an SDN controller to identify services being requested (step 830). The list of services is searched for matches (step 840), if found, a unicast message to initiate services between advertiser and requestor is sent (step 850). In one embodiments, matches are made based on, in part, one or more of SVR, PTR and TXT records.

Generic Computing Device (FIG. 9)

FIG. 9 is a block diagram illustrating an exemplary computing device 900 for use in the system 100 of FIG. 1, according to one embodiment. The computing device 900 is an exemplary device that is implementable for each of the components of the system 100, including the SDN controller 110, the Wi-Fi controller 120, the access points 130A-N, and the stations 140A-N. The computing device 900 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 900, of the present embodiment, includes a memory 910, a processor 920, a storage drive 930, and an I/O port 940. Each of the components is coupled for electronic communication via a bus 999. Communication can be digital and/or analog, and use any suitable protocol.

The memory 910 further comprises network applications 912 and an operating system 914. The network applications 912 can include the modules of the SDN controller 110, the Wi-Fi controller 120, or the access point 130, as illustrated in FIGS. 3-5. Other network applications 912 can include a web browser, a mobile application, an application that uses networking, a remote application executing locally, a network protocol application, a network management application, a network routing application, or the like.

The operating system 914 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 920 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 920 can be single core, multiple core, or include more than one processing elements. The processor 920 can be disposed on silicon or any other suitable material. The processor 920 can receive and execute instructions and data stored in the memory 910 or the storage drive 930

The storage drive 930 can be any non-volatile type of storage such as a magnetic disc, EEPROM, Flash, or the like. The storage drive 730 stores code and data for applications.

The I/O port 940 further comprises a user interface 942 and a network interface 944. The user interface 942 can output to a display device and receive input from, for example, a keyboard. The network interface 944 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a software-defined network (SDN) controller for extending Wi-Fi services available within a subnet to an entirety of a communication network by centrally coordinating data plane behavior, the method comprising the steps of:
    centrally monitoring data plane traffic flow at each of the plurality of network components distributed around the communication network for a plurality of subnets;
    receiving one or more packets forwarded from one of the network components and concerning an advertisement for services within a first subnet by an advertising station, the advertisement being multicast to the subnet and the forward being unicast to the SDN controller;
    extracting parameters of the service of the advertising station for storage by performing deep packet inspection on the one or more packets;
    receiving one or more packets forwarded from one of the network components and concerning a query for service within a second subnet by a querying station, the query being multicast to the subnet and the forward being unicast to the SDN controller;
    extracting parameters of the service of the querying station for storage by performing deep packet inspection on the one or more packets;
    inferring the query for service from circumstances of packet data including device type and the extracted parameters;
    matching the query for service to the advertisement responsive to the advertisement parameters compared to the query parameters; and
    responsive to matching, sending a set of connection parameters necessary for the querying station at the second subnet to connect to the advertising station at the first subnet.

2. The method of claim 1, further comprising:
    receiving a subnet extension policy that indicates which subnets are extended to provide services to the plurality of subnets.

3. The method of claim 1, further comprising:
    receiving a subnet extension policy that indicates which subnets are extended to receive services to the plurality of subnets.

4. The method of claim 1, further comprising:
    configuring forwarding packets for advertisements and/or queries with Open Flow rules.

5. The method of claim 4, further comprising:
    configuring dropping packets for advertisements and/or queries with Open Flow rules once initial advertisements and/or queries have been forwarded.

6. The method of claim 1, wherein extracting parameters of the advertising service, comprises at least one of:
    extracting a SRV (service record);
    extracting a PTR (pointer record); and
    extracting a TXT (text record).

7. The method of claim 1, wherein at least two of the plurality of access points implementing the rules are manufactured by different vendors and have distinct operating systems.

8. A non-transitory computer-readable medium storing source code that, when executed by a processor, performs a method in a software-defined network (SDN) controller for extending Wi-Fi services available within a subnet to an entirety of a communication network by centrally coordinating data plane behavior, the method comprising the steps of:

centrally monitoring data plane traffic flow at each of the plurality of network components distributed around the communication network for a plurality of subnets;

receiving one or more packets forwarded from one of the network components and concerning an advertisement for services within a first subnet by an advertising station, the advertisement being multicast to the subnet and the forward being unicast to the SDN controller;

extracting parameters of the service of the advertising station for storage by performing deep packet inspection on the one or more packets;

receiving one or more packets forwarded from one of the network components and concerning a query for service within a second subnet by a querying station, the query being multicast to the subnet and the forward being unicast to the SDN controller;

extracting parameters of the service of the querying station for storage by performing deep packet inspection on the one or more packets;

inferring the query for service from circumstances of packet data including device type and the extracted parameters;

matching the query for service to the advertisement responsive to the advertisement parameters compared to the query parameters; and responsive to matching, sending a set of connection parameters necessary for the querying station at the second subnet to connect to the advertising station at the first subnet.

9. An SDN (Software-Defined Networking) controller to extend Wi-Fi services available within a subnet to an entirety of a communication network by centrally coordinating data plane behavior, the SDN controller comprising:

a processor; and a memory, storing:

a first module to centrally monitor data plane traffic flow at each of the plurality of network components distributed around the communication network for a plurality of subnets;

a second module to receive one or more packets forwarded from one of the network components and concerning an advertisement for services within a first subnet by an advertising station, the advertisement being multicast to the subnet and the forward being unicast to the SDN controller;

a third module to extract parameters of the service of the advertising station for storage by performing deep packet inspection on the one or more packets;

a fourth module to receive one or more packets forwarded from one of the network components and concerning a query for service within a second subnet by a querying station, the query being multicast to the subnet and the forward being unicast to the SDN controller;

a fifth module to extract parameters of the service of the querying station for storage by performing deep packet inspection on the one or more packets and inferring the query for service from circumstances of packet data including device type and the extracted parameters;

a seventh module to match the query for service to the advertisement responsive to the advertisement parameters compared to the query parameters; and an eight module to, responsive to matching, send a set of connection parameters necessary for the querying station at the second subnet to connect to the advertising station at the first subnet.

* * * * *